United States Patent
Council, III

(10) Patent No.: US 9,999,909 B2
(45) Date of Patent: Jun. 19, 2018

(54) SOIL GAS AND GROUNDWATER REMEDIATION SYSTEM AND METHOD

(71) Applicant: Edward Augustus Council, III, Xenia, OH (US)

(72) Inventor: Edward Augustus Council, III, Xenia, OH (US)

(*) Notice: Subject to any disclaimer, the term of this patent is extended or adjusted under 35 U.S.C. 154(b) by 264 days.

(21) Appl. No.: 15/092,775

(22) Filed: Apr. 7, 2016

(65) Prior Publication Data

US 2017/0291202 A1    Oct. 12, 2017

(51) Int. Cl.
| | |
|---|---|
| *B01D 53/02* | (2006.01) |
| *B09C 1/00* | (2006.01) |
| *B09C 1/10* | (2006.01) |
| *C02F 1/20* | (2006.01) |
| *B01D 19/00* | (2006.01) |

(52) U.S. Cl.
CPC .......... *B09C 1/005* (2013.01); *B01D 19/0036* (2013.01); *B09C 1/002* (2013.01); *B09C 1/105* (2013.01); *C02F 1/20* (2013.01); *B09C 2101/00* (2013.01)

(58) Field of Classification Search
CPC ..... B01D 19/0036; B09C 1/002; B09C 1/005; B09C 1/105; B09C 2101/00; C02F 1/20
See application file for complete search history.

(56) References Cited

U.S. PATENT DOCUMENTS

| | | | |
|---|---|---|---|
| 5,076,727 A | 12/1991 | Johnson et al. | |
| 5,106,232 A * | 4/1992 | Metzer | B09C 1/005 |
| | | | 166/370 |
| 5,160,217 A * | 11/1992 | Metzer | B09C 1/005 |
| | | | 405/128.2 |
| 5,221,159 A | 6/1993 | Billings et al. | |
| 5,249,888 A | 10/1993 | Braithwaite et al. | |
| 5,277,518 A * | 1/1994 | Billings | B09C 1/00 |
| | | | 166/246 |
| 5,279,740 A | 1/1994 | Basile et al. | |
| 5,402,848 A * | 4/1995 | Kelly | B09C 1/005 |
| | | | 166/266 |
| 5,464,309 A * | 11/1995 | Mancini | B09C 1/005 |
| | | | 166/236 |
| 5,472,294 A * | 12/1995 | Billings | B09C 1/00 |
| | | | 166/246 |

(Continued)

*Primary Examiner* — Christopher P Jones
(74) *Attorney, Agent, or Firm* — Ancel W. Lewis, Jr.; Cochran Freund & Young LLC

(57) ABSTRACT

A system for intercepting, treating and venting vapors from contaminated soil in the vadose zone and from contaminated groundwater includes a large borehole and at least one small borehole each having an open top end, a porous liner against the outer wall and porous fill material inside the liner. The fill material can include materials to retard and degrade contaminants in the vapors. The large and small boreholes can have impermeable sections in the liner, and impermeable ground cover around the top ends. The large borehole can also include a slotted aeration tube in the borehole and vegetation planted in the open end of the borehole. A method for intercepting, treating and venting of vapors from contaminated soil in the vadose zone and contaminated groundwater includes the system and pulling vapors out the top end of the large borehole with variations in atmospheric barometric pressure.

18 Claims, 1 Drawing Sheet

(56) References Cited

U.S. PATENT DOCUMENTS

| | | | |
|---|---|---|---|
| 5,611,402 A * | 3/1997 | Welsh | B09C 1/005 |
| | | | 166/369 |
| 5,611,642 A * | 3/1997 | Wilson | B09C 1/00 |
| | | | 166/278 |
| 5,615,974 A * | 4/1997 | Land | B09C 1/005 |
| | | | 405/128.35 |
| 5,626,437 A * | 5/1997 | Hunt | B09C 1/002 |
| | | | 210/610 |
| 5,697,437 A | 12/1997 | Weidner et al. | |
| 5,874,001 A * | 2/1999 | Carter | B09C 1/002 |
| | | | 210/610 |
| 6,024,868 A * | 2/2000 | Salotti | B09C 1/005 |
| | | | 166/53 |
| 6,158,924 A * | 12/2000 | Athens | B09C 1/002 |
| | | | 166/268 |
| 6,428,694 B1 * | 8/2002 | Brown | B09C 1/00 |
| | | | 210/143 |
| 6,979,150 B1 | 12/2005 | Varvel | |
| 9,289,806 B2 * | 3/2016 | Council, III | B09C 1/005 |
| 9,827,604 B2 * | 11/2017 | Council, III | B09C 1/002 |
| 2003/0129735 A1 * | 7/2003 | Moorhead | B09C 1/002 |
| | | | 435/262.5 |
| 2009/0095638 A1 * | 4/2009 | Skoczylas | B09C 1/002 |
| | | | 205/742 |
| 2010/0078372 A1 * | 4/2010 | Kerfoot | B01F 3/04262 |
| | | | 210/150 |
| 2011/0198071 A1 * | 8/2011 | Swearingen | B09C 1/002 |
| | | | 166/50 |

\* cited by examiner

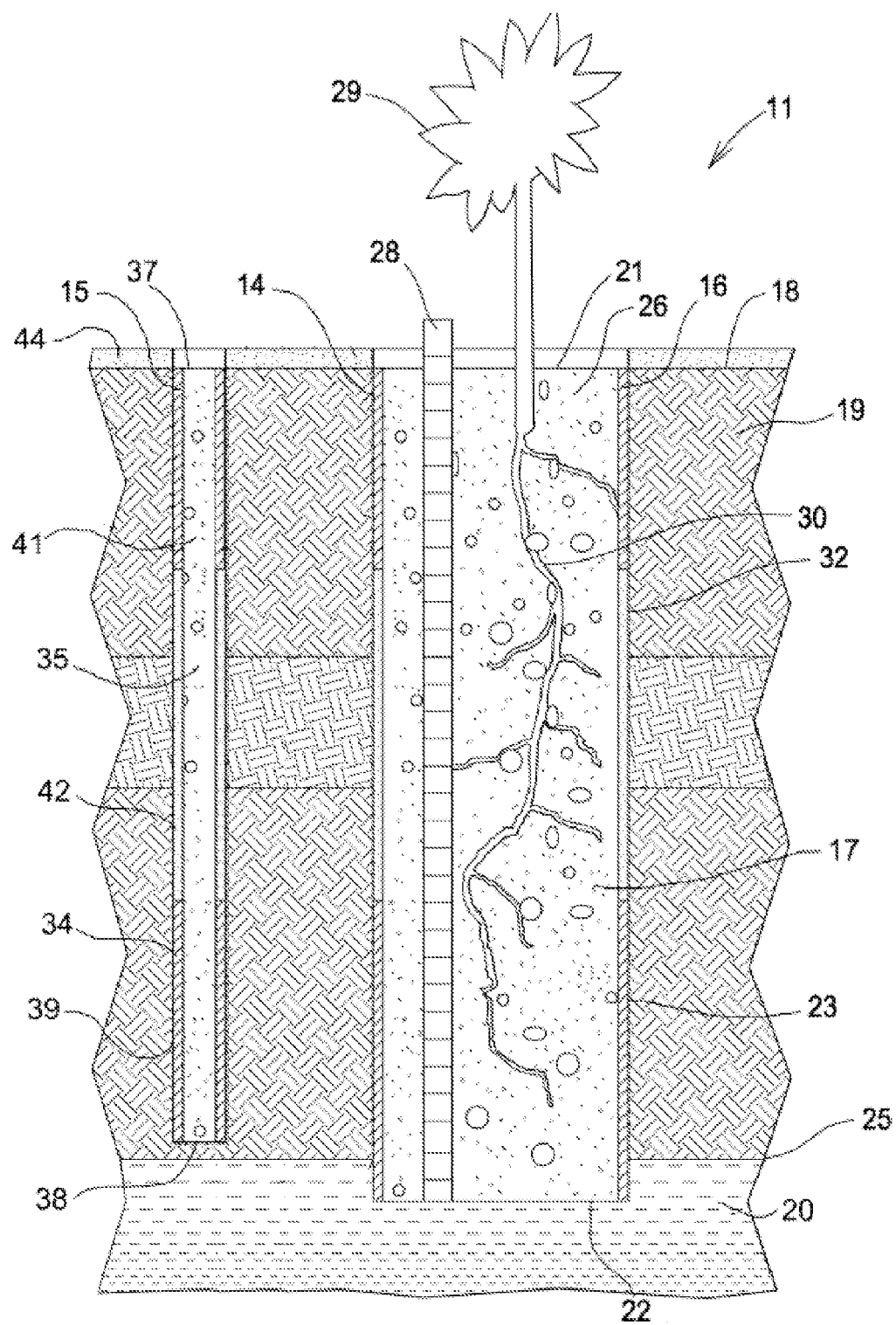

SOIL GAS AND GROUNDWATER REMEDIATION SYSTEM AND METHOD

TECHNICAL FIELD

The present invention relates to soil and groundwater remediation, and more particularly to a passive system and method for intercepting, treating and venting volatile and semi-volatile contaminants from soil and groundwater.

BACKGROUND ART

Approximately half of the people in the United States rely on groundwater as their primary source of drinking water. Unfortunately, groundwater contamination is very common. Major sources of groundwater contamination include natural sources, underground storage tanks, septic tanks, hazardous waste sites, landfills, chemical storage facilities, chemical spills, and agricultural activities. Man-made/anthropogenic sources are of particular concern as exposure to these types of contaminants can cause cancer or other serious health impairments in people.

The U.S. Environmental Protection Agency estimates that volatile organic chemicals (VOCs) are present in one-fifth of the nation's water supplies. VOCs are a class of chemical compounds that can often result in significant environmental impacts due to the ease the VOCs have migrating between soil and water. As such, once released at or near the ground surface, the VOCs often migrate into and through the unsaturated soils or rock of the vadose zone before impacting the underlying saturated intervals of the groundwater.

The vadose zone generally consists of porous to slightly porous materials that are often present in horizontal layers. Porosity levels vary from layer to layer with the conductance of liquids and gases usually much greater in the horizontal than vertical directions. Conductance of liquids and gases is also usually much greater in the horizontal than vertical directions in the saturated materials located below the water table in a zone commonly defined as a groundwater aquifer. After migrating into groundwater, volatile and semi-volatile materials can also evaporate back into the vadose zone and become part of the soil gas if favorable conditions exist. Favorable conditions are often dominated by permeable materials, where contaminants have concentrations greater than 1% of the contaminant's solubility levels, have a Henry's Law Constant greater than $1*10^{-5}$ atm-$m^3$/mole and have vapor pressures greater than 0.1 mm Hg.

Under static subsurface conditions, soil gas and contaminants in and around the soil gas, will ultimately be homogeneous as the soil gas and contaminants reach toward a state of equilibrium. However, volatile and semi-volatile materials evaporating from groundwater will migrate into and through the vadose zone if a pathway conducive to the movement of the volatile and semi-volatile materials exists. If a porous pathway does not exist, the vapors will remain confined in semi-equilibrium with the soil and will slowly diffuse towards the ground surface.

Subsurface conditions can change, and soil gases in the soil will move toward a new state of equilibrium. Diffusion and convection are the two primary mechanisms responsible for the transport of soil gases migrating through the vadose zone. The moving forces for diffusion are the concentration gradients of the various compounds and elements, resulting in migration from zones of higher concentrations to zones with lower concentrations. Convective transport on the other hand occurs when the soil gases move through the soil pores under the influence of an external driving force. The convective forces may include variations in barometric pressures, wind gusts occurring above the soil surface, as well as density driven transport caused by changes in subsurface temperatures and moisture content. The relative importance of these forces are difficult to differentiate and appear to strongly vary both temporally and under small scale site-specific conditions.

Regardless of the forces inducing soil gas flow, the soil also plays an important function in the transmission of gases due to its permeability. Unsaturated soils with low permeability of less than $10^{-7}$ $cm^2$ often result in slower diffusive processes dominating whereas with higher permeability a much faster convective transport occurs. Further, under conditions where the vertical permeability and conductivity of the unsaturated zone are mechanically increased, such as through agricultural tilling, faster conductive processes have historically been reported to occur, at least in the uppermost and near surface intervals (Renault, P., Mohrath, D., Gaudu, J. C., Fumanal, J. C., 1998, Air Pressure fluctuations in a prairie soil, Soil Science Society of America Journal, v. 62, pp. 553-563).

Prior known remediation systems and methods to treat contaminated soil and groundwater include two main types: in-situ treatments that primarily treat contamination below the ground surface, and treatment processes that occur mostly above the ground surface. All of these prior known soil and groundwater remediation systems and methods require expensive engineered treatment wells and above ground infrastructure to support or control the remediation activities or the drilling of boreholes where expensive chemicals are injected or energy sources are used to treat the subsurface contamination. The engineered treatment wells include cased wells that extend into the vadose zone and may extend into the contaminated groundwater. The cased wells have casings that have smaller diameters than the boreholes and often extend several feet above ground.

The time needed to complete the soil and/or groundwater remediation often takes years to decades to complete, due to incorrect remedial designs, inefficiencies of the various treatment systems, and/or equipment failures. Modifications to improve the efficiency of these treatment systems, after the systems are installed, are often difficult to identify and/or extremely expensive to implement. Further, during the remediation period the impacted properties rarely can be used for any other purpose other than the operation of the treatment system.

The cased well casings in the prior known groundwater remediation systems and methods have a screen section that extends upwardly a selected distance from the bottom end of the borehole. These cased wells generally have engineered porous fill material located between the screen and the borehole wall from the bottom end up to slightly above the top of the screen section. Above the fill material substantially impermeable materials seal the space between the casing and the borehole wall. Fluids can only travel up or down the inside of the casing from the screened section to treatment systems located above the ground surface and usually located at some distance from the treatment wells.

The wells associated with prior known remediation systems are: 1) constructed to treat only the single zone adjacent to the screened well section; 2) not capable of allowing the area-wide mixing of atmospheric gases and temperatures into the vadose zone to enhance the remedial influence of barometric pumping; 3) not used as a single remedial treatment method to remove volatile and semi-volatile contaminants from impacted soil and groundwater; 4) not able to depress the volatilization potential of soil gas contaminants during colder weather; and 5) limited in location as the above ground components are restricted to areas where near ground obstructions are not a hazard to transportation systems, pedestrian or recreational uses.

The prior known remediation systems include various blowers, pumps and other components that are often expensive. Power to run the mechanical and electrical components, as well as the ongoing equipment maintenance activities adds to the cost. In addition, regulatory requirements in many states require that treatment wells and other components be removed after the systems are no longer in use, adding to the costs associated with operating these prior known remediation systems.

DISCLOSURE OF THE INVENTION

A system for intercepting, treating and venting vapors from contaminated soil and groundwater includes a large borehole with a gas permeable liner and porous fill material, and at least one small borehole with a gas permeable liner and porous fill material. The small borehole has a diameter significantly less than the diameter of the large borehole. The large borehole and the small borehole each define a borehole cavity, and each have a bottom end at a selected depth, a spaced, open top end at the ground level and an inwardly facing outer wall of soil extending from the bottom end to the top end. Each liner is against the outer wall and around the borehole cavity. The fill material fills each borehole cavity and has a porosity significantly greater than the soil. Variations in atmospheric barometric pressure pull atmospheric air into the large and small boreholes and into the soil, mix the air with vapor from the soil and the groundwater, and pull the mixture of air and vapor into the borehole cavity and out the open top end of the large borehole. A method for intercepting, treating and venting of vapors from contaminated groundwater includes the steps of providing the system described above and pulling vapors from the groundwater and soil to the borehole cavity and out the top end of the large borehole with variations in atmospheric barometric pressure.

BRIEF DESCRIPTION OF THE DRAWINGS

Details of this invention are described in connection with the accompanying drawing that bears similar reference numerals in which:

The FIGURE is a schematic side elevation view of a system embodying features of the present invention.

DETAILED DESCRIPTION OF THE INVENTION

Referring to the FIGURE, a system 11 for intercepting, treating and venting vapors from contaminated soil and groundwater, embodying features of the present invention, a large borehole 14 and at least one spaced small borehole 15. The large borehole 14 has a liner 16 and fill material 17. The large borehole 14 has a selected diameter and is drilled from ground level 18 downwardly to a selected depth through the soil 19. The large borehole 14 has an open top end 21 at ground level 18, a spaced bottom end 22 at the selected depth, and an inwardly facing outer wall 23 of the soil 19 that extends from the top end 21 to the bottom end 22. The bottom end 22 can be located above, at or below the water table 25. The large borehole 14 defines a borehole cavity 26.

The liner 16 fits into the large borehole 14 against the outer wall 23, and extends around the borehole cavity 26 from the top end 21 to the bottom end 22. The liner 16 is gas permeable and can be made from organic or inorganic mesh, or other porous material that easily transmit soil gases or liquids, and reduce and prevent fine grain particles in the soil 19 migrating into the borehole cavity 26. The liner 16 can include one or more gas impermeable sections 32 at selected depths to prevent seepage of water and other substances from specific layers in the soil 19, such as saturated layers or intervals in the otherwise unsaturated vadose zone.

The borehole cavity 26, inside the liner 16, is filled to the top end 21 of the large borehole 14 with the fill material 17. The fill material 17 is porous to allow the free flow of vapors into and up the borehole cavity 26. The fill material 17 is preferably sand or gravel consisting of particles within a well-defined size range. The uniform size of the particles in the fill material 17 prevents compaction and maintains porosity in the borehole cavity 26. Preferably, the fill material 17 has a porosity an order of magnitude greater than the porosity of the surrounding soil 19.

The fill material 17 prevents collapse of the large borehole 14 and keeps the large borehole 14 open to gas movement. The fill material 17 allows the vapors and air to exist at barometric pressure levels throughout the entire length of the large borehole 14. The fill material 17 allows the unimpeded migration of vapors at higher pressure up the large borehole 14 to the ground level 18 when favorable barometric conditions exist.

Materials capable of retarding and/or degrading contaminants in the vapors can be added to the fill material 17 to selectively remediate the contaminants as the vapors moves up the large borehole 14 to ground level 18. The materials for retarding and/or degrading contaminants in the vapors can include one or all of organic carbon, reactive iron and nutrients for microbial activity.

The system 11 can include a slotted aeration tube 28 having a diameter smaller than the diameter of the large borehole 14. The tube 28 extends downwardly through the fill material 17 from the top end 21 to the bottom end 22 of the large borehole 14. The tube 28 aids the transfer of vapors into the atmosphere from the entire length of the large borehole 14.

The system 11 can include vegetation 29 planted in the fill material 17 at the top end 21 of the large borehole 14. The roots 30 of the vegetation 29 extend downwardly into the fill material 17. The roots 30 reduce settling and compaction of the fill material 17, and thereby maintain the permeability and porosity of the fill material 17. The roots 30 can also phytoremediate contaminants that become bound to the fill material 17 inside the large borehole 14.

Preferably, the system 11 includes one to three small boreholes 15 for each large borehole 14. The large borehole 14 has a radius or zone of influence, an area around the large borehole 14 affected by pressure changes in the large borehole 14. Each small borehole 15 is located within the radius of influence of the large borehole 14.

The small borehole 15 has a liner 34 and fill material 35. The small borehole 15 is drilled from ground level 18 downwardly to a selected depth through the soil 19. The small borehole 15 has an open top end 37 at ground level 18, a spaced bottom end 38 at the selected depth, and an inwardly facing outer wall 39 of the soil 19 that extends from the top end 37 to the bottom end 38. The small borehole 15 defines a borehole cavity 41.

The depth of the small borehole 15 is less than the depth of the large borehole 14 such that the bottom end 38 of the small borehole 15 is located above the bottom end 22 of the large borehole 14. Preferably, when the bottom end 22 of the large borehole 14 is above the water table 25, the bottom end 38 of the small borehole 15 is located about one half foot to one foot above the bottom end 22 of the large borehole 14. When the bottom end 22 of the large borehole 14 is below the water table 25, the bottom end 38 of the small borehole 15 should be located about one half foot to one foot above the water table 25. The small borehole 15 should have a diameter less than 10% of the diameter of the large borehole 14, and preferably less than 5% of the diameter of the large borehole 14.

The liner 34 fits into the small borehole 15 against the outer wall 39, and extends around the borehole cavity 41 from the top end 37 to the bottom end 38. The liner 34 is gas permeable and can be made from organic or inorganic mesh, or other porous materials that easily transmit soil gases or liquids, and reduce and prevent fine grain particles in the soil 19 migrating into the borehole cavity 41. The liner 34 can include one or more gas impermeable sections 42 at selected depths to prevent seepage of water and other substances from specific layers in the soil 19, such as saturated layers or intervals in the otherwise unsaturated vadose zone.

The borehole cavity 41, inside the liner 34, is filled to the top end 37 of the small borehole 15 with the fill material 35. The fill material 35 is porous to allow the free flow of vapors into and up the borehole cavity 41. The fill material 35 is preferably sand or gravel consisting of particles within a well-defined size range. The uniform size of the particles in the fill material 35 prevents compaction and maintains porosity in the borehole cavity 41. Preferably, the fill material 35 has a porosity an order of magnitude greater than the porosity of the surrounding soil 19.

The fill material 35 prevents collapse of the small borehole 15 and keeps the small borehole 15 open to gas movement. The fill material 35 allows the vapors and air to exist at barometric pressure levels throughout the entire length of the small borehole 15. The fill material 35 allows the unimpeded migration of vapors up and down the small borehole 15 when favorable barometric conditions exist.

Materials capable of retarding and/or degrading contaminants in the vapors can be added to the fill material 35 to selectively remediate the contaminants as the vapors moves up the small borehole 15 to ground level 18. The materials for retarding and/or degrading contaminants in the vapors can include one or all of organic carbon, reactive iron and nutrients for microbial activity.

The system 11 can include ground cover 44 around the top end 21 of the large borehole 14 and the top end 37 of the small borehole 15 on top of the soil 19 at ground level 18. The ground cover 44 is made from a material of low permeability, such as bentonite clay, concrete or a geosynthetic liner. The ground cover 44 traps vapors in the shallow subsurface soil 19, and allows the pressure of the vapors to increase above barometric pressure levels.

A method for intercepting, treating and venting vapors from contaminated groundwater, embodying features of the present invention, includes the steps of providing the system 11, as described above, injecting atmospheric gases into the borehole cavity 41 of the small borehole 15 and into the soil 19 with variations in atmospheric barometric pressure and pulling the vapors from the soil 19 to the borehole cavity 26 and out the top end 21 of the large borehole 14 with variations in atmospheric barometric pressure. More specifically the method includes the steps of providing a large borehole 14 with a selected diameter, installing a liner 16 of porous material in the large borehole 14, filling a borehole cavity 26 inside the liner 16 with porous fill material 17, providing a spaced small borehole 15 with a selected diameter, installing a liner 34 of porous material in the small borehole 15, filling a borehole cavity 41 inside the liner 34 with porous fill material 35, injecting atmospheric gases into the borehole cavity 41 of the small borehole 15 and into the soil 19 with variations in atmospheric barometric pressure, and pulling the vapors from the soil 19 within the radius of influence of the large borehole 14 to the borehole cavity 26 and out the top end 21 of the large borehole 14 with variations in atmospheric barometric pressure.

The large borehole 14 has a top end 21 at the ground level 18, a spaced bottom end 22 at a selected depth and an inwardly facing outer wall 23 of soil 19 extending downwardly from the top end 21 to the bottom end 22. The large borehole 14 defines a borehole cavity 26. The top end 21 is open to atmosphere above the ground level 18 to allow unimpeded flow of gases. The liner 16 is installed in the large borehole 14 against the outer wall 23, around the borehole cavity 26 from the top end 21 to the bottom end 22 to reduce and prevent fine grain particles in the soil 19 migrating into the borehole cavity 26.

The small borehole 15 has a top end 37 at the ground level 18, a spaced bottom end 38 at a selected depth and an inwardly facing outer wall 39 of soil 19 extending downwardly from the top end 37 to the bottom end 38. The small borehole 15 defines a borehole cavity 41. The top end 37 is open to atmosphere above the ground level 18 to allow unimpeded flow of gases. The liner 34 is installed in the small borehole 15 against the outer wall 39, around the borehole cavity 41 from the top end 37 to the bottom end 38 to reduce and prevent fine grain particles in the soil 19 migrating into the borehole cavity 41.

The diameter of the small borehole 15 is less than ten percent and preferably less than five percent of the diameter of the large borehole 14. The depth of the bottom end 38 of the small borehole 15 is less than the depth of the bottom end 22 of the large borehole 14. When the bottom end 22 of the large borehole 14 is below the water table 25, the bottom end 38 of the small borehole 15 is spaced above the water table 25. The large borehole 14 has a radius of influence and the small borehole 15 is within the radius of influence of the large borehole 14.

The method can also include the steps of providing a hollow, slotted aeration tube 28 having a diameter smaller than the large borehole 14 with the tube 28 extending through the fill material 17 from the top end 21 towards the bottom end 22 of the large borehole 14, planting vegetation 29 in the fill material 17 at the top end 21 of the large borehole 14 with roots 30 extending downwardly to reduce compaction and maintain porosity of the fill material 17, and providing a ground cover 44 of low permeability material around the top end 21 of the large borehole 14 and small borehole 15, at ground level 18, over the soil 19.

The fill material 17 of the large borehole 14 and the fill material 35 of the small borehole 15 can include materials capable of retarding and/or degrading contaminants in the vapors to selectively remediate the contaminants such as organic carbon, reactive iron and/or nutrients for microbial activity. The fill material 17 of the large borehole 14 and the fill material 35 of the small borehole 15 has a porosity at least an order of magnitude greater than the soil 19. The liner 16 of the large borehole 14 can have at least one gas impermeable section 32 at a selected depth, and the liner 34 of the small borehole 15 can have at least one gas impermeable section 42 at a selected depth.

The system 11 creates conditions whereby changes that periodically occur to the atmospheric pressure and differences between the atmospheric pressure and pressures present at the water table 25 cause the off-gassing of volatile and semi-volatile contaminants from the groundwater 20. The system 11 provides a preferential porous pathway that allows the collection of the contaminated vapors present both adjacent to the water table 25 and contaminated vapors that have migrated from the groundwater 20 but remain within the vadose zone and within the radius of influence of the large borehole 14. The system 11 provides a route for the unimpeded migration of contaminated vapors within the large borehole 14 and into the atmosphere. Changes in pressure between the vapors and the atmosphere provide the mechanism for the movement of the vapors into the large borehole 14 and upward towards the atmosphere.

The smaller borehole 15 allows atmospheric gases at atmospheric temperatures to migrate into the vadose zone when atmospheric pressures are higher than those in the vadose zone. Atmospheric gases at atmospheric temperatures will also migrate into the vadose zone through the large borehole 14 when atmospheric pressures are higher than those in the vadose zone. Once in the subsurface the atmospheric gases mix with the soil gases. When atmospheric pressures are less than those in the vadose zone, a larger portion of the mixed and un-mixed soil gases are then preferentially pulled to and discharged out of the large borehole 14 due to the significantly greater cross-sectional area of the large borehole 14 relative to the cross-sectional area of the smaller borehole 15. Due to the greater discharge potential of soil gases through the large borehole 14 and a need to conserve soil gas mass, the venting of gases through the small borehole 15 is reduced during the lower atmospheric pressure events due to the greater influence of the nearby large borehole 14.

As a result, soil and residual atmospheric gases in and around the small borehole 15 are preferentially forced by convective transport processes to move horizontally toward the large borehole 14. Soil gas composition and temperatures levels change as the gases move toward the large borehole 14 where the gases are vented into the atmosphere. During colder periods when migration of impacted soil gases are preferentially pulled by buoyancy issues toward adjacent buildings, the decrease in soil gas temperatures reduces the volatilization potential of subsurface contaminants.

The system 11: 1) creates a porous large borehole 14 that is constructed to be a collection area for contaminated vapors present both adjacent to the water table 25 and elsewhere within the vadose zone; 2) creates at least one small borehole 15 constructed near the large borehole 14 to periodically act, along with the large borehole 14, as pathways for atmospheric gases and temperature levels to migrate into the subsurface; 3) allows changes that intermittently lower atmospheric pressures to cause off-gassing of volatile and semi-volatile compound's from the groundwater and soil 19; 4) creates the route for the unimpeded migration of slightly pressurized contaminated vapors and residual atmospheric gases into and through the large borehole 14 where contaminated vapors and residual atmospheric gases are discharged into the atmosphere; 5) results in the dominant removal of soil gases by the large borehole 14 due to the conservation of mass as the large quantities of vapors are preferentially pulled towards the large borehole 14 such that the conservation of mass reduces/overpowers the area-wide venting potential of the small borehole 15; 6) results in residual atmospheric gases present near the small borehole 15 periodically being pulled horizontally through the vadose zone at greater lateral distances than could occur by the large borehole 14 alone; and 7) results in the residual atmospheric gases at residual temperature levels, to change the subsurface soil gas temperature and oxygen levels as the residual atmospheric gases and soil gas are pulled horizontally toward the large borehole 14. The system 11 results in an increased efficiency to treat contaminated soils, groundwater and soil gases than the small borehole 15 or large borehole 14 could achieve individually.

The cost to construct the system 11 is significantly less than the cost to construct the wells in prior known groundwater remediation systems. The system 11 eliminates operating costs associated with the prior known groundwater remediation systems. The system 11 eliminates the maintenance costs associated with the prior known groundwater remediation systems. The system 11 does not need to be removed when use of the system 11 stops, eliminating the removal costs associated with the wells in prior known groundwater remediation systems.

The wells in prior known groundwater remediation systems are constructed with a single screen section adjacent to the bottom of the casing, and do not treat or vent vapors that have migrated from the groundwater 20 into the vadose zone. The system 11 vents vapors from layers along the whole extent of the large borehole 14, as compared to the wells in prior known groundwater remediation systems that only vent vapors from a small interval near the bottom. The system 11 can be built flush with the ground level 18 and therefore can be located almost anywhere, including areas prone to vehicle and pedestrian traffic. The prior known groundwater remediation systems project above the ground, would be damaged by vehicle traffic, and would present a tripping hazard for pedestrian traffic.

A primary advantage of the system 11 is the much lower capital and operating costs. The low costs allow considerably more soil gas extraction boreholes to be installed per contaminated acre than conventional treatment systems and to be operated at limited cost for extended periods of time. Further, modifications to the system 11, such as addition of extra small boreholes 15 and/or large boreholes 14 can easily occur at most sites to improve the efficiency of the treatment process whereas post construction modifications may be impossible to do or can only occur at significant additional costs using other remedial methods. The system 11 can also: 1) complement other treatment systems, such as phytoremediation; 2) be installed where space limiting issues significantly impact the type or design of other treatment systems; and 3) be installed/operated where low levels of contamination are still present on part of a property and where other treatment methods are no longer cost effective in treating low level or residual contamination.

Although the present invention has been described with a certain degree of particularity, it is understood that the present disclosure has been made by way of example and that changes in details of structure may be made without departing from the spirit thereof.

What is claimed is:

1. A system for intercepting, treating and venting vapors from contaminated soil in a vadose zone that extends downwardly from a ground level to a water table and from contaminated groundwater below said water table, comprising:
   a large borehole with a selected diameter, said large borehole having a top end at said ground level, a spaced bottom end at a selected depth and an inwardly facing outer wall of soil extending downwardly from said top end to said bottom end, said large borehole defining a borehole cavity, said top end being open to atmosphere above said ground level to allow unimpeded flow of gases, said large borehole having a liner of porous material against said outer wall and around said borehole cavity from said top end to said bottom end, and porous fill material inside said liner and filling said borehole cavity, and at least one small borehole spaced from said large borehole and having a selected diameter significantly smaller than said diameter of said large borehole, said small borehole having a top end at said ground level, a spaced bottom end at a selected depth and an inwardly facing outer wall of soil extending downwardly from said top end to said bottom end, said small borehole defining a borehole cavity, said top end being open to atmosphere above said ground level to allow unimpeded flow of gases, said small borehole having a liner of porous material against said outer wall and around said borehole cavity from said top end to said bottom end, and porous fill material inside said liner and filling said borehole cavity, whereby variations in atmospheric barometric pressure pull said vapors from said groundwater and said soil to said borehole cavity of said large borehole and out said top end of said large borehole, wherein said large borehole has a radius of influence and said small borehole is within said radius of influence.

2. The system as set forth in claim 1 wherein said diameter of said small borehole is less than ten percent of said diameter of said large borehole.

3. The system as set forth in claim 1 wherein said depth of said bottom end of said small borehole is less than said depth of said bottom end of said large borehole.

4. The system as set forth in claim 3 wherein said bottom end of said large borehole is spaced below said water table and said bottom end of said small borehole is spaced above said water table.

5. The system as set forth in claim 1 wherein said large borehole includes a hollow, slotted aeration tube having a diameter smaller than said diameter of said large borehole, said tube extending through said fill material from said top end towards said bottom end of said large borehole.

6. The system as set forth in claim 5 wherein said tube extends to said bottom end.

7. The system as set forth in claim 1 wherein said fill material in said large borehole has a porosity at least an order of magnitude greater than said soil and said fill material in said small borehole has a porosity at least an order of magnitude greater than said soil.

8. The system as set forth in claim 1 wherein said fill material in said large borehole includes materials to retard and degrade contaminants in said vapors.

9. The system as set forth in claim 1 wherein said fill material in said large borehole includes at least one of organic carbon, reactive iron and nutrients for microbial activity.

10. The system as set forth in claim 1 wherein said large borehole includes vegetation planted in said fill material at said top end with roots extending downwardly to reduce compaction and maintain porosity of said fill material.

11. The system as set forth in claim 1 wherein said liner of said large borehole has at least one gas impermeable section at a selected depth.

12. The system as set forth in claim 1 including a ground cover of low permeability material around said top end of said large borehole and around said top end of said small borehole, at said ground level over said soil.

13. The system as set forth in claim 1 wherein said liner in said large borehole is mesh and said liner in said small borehole is mesh.

14. A system for intercepting, treating and venting vapors from contaminated soil in a vadose zone that extends downwardly from a ground level to a water table and from contaminated groundwater below said water table, comprising:

a large borehole with a selected diameter, said large borehole having a top end at said ground level, a spaced bottom end at a selected depth and an inwardly facing outer wall of soil extending downwardly from said top end to said bottom end, said large borehole defining a borehole cavity, said top end being open to atmosphere above said ground level to allow unimpeded flow of gases, said large borehole having a mesh liner against said outer wall and around said borehole cavity from said top end to said bottom end and porous fill material inside said liner and filling said borehole cavity, said fill material having a porosity at least an order of magnitude greater than said soil, said fill material including materials to retard and degrade contaminants in said vapors, said fill material including at least one of organic carbon, reactive iron and nutrients for microbial activity, said large borehole having a hollow, slotted aeration tube having a diameter smaller than said large borehole, said tube extending through said fill material from said top end towards said bottom end of said large borehole, and at least one small borehole spaced from said large borehole and having a selected diameter significantly smaller than said diameter of said large borehole, said small borehole having a top end at said ground level, a spaced bottom end at a selected depth and an inwardly facing outer wall of soil extending downwardly from said top end to said bottom end, said small borehole defining a borehole cavity, said top end being open to atmosphere above said ground level to allow unimpeded flow of gases, said small borehole having a mesh liner against said outer wall and around said borehole cavity from said top end to said bottom end and porous fill material inside said liner and filling said borehole cavity, said fill material having a porosity at least an order of magnitude greater than said soil, whereby variations in atmospheric barometric pressure pull said vapors from said groundwater and said soil to said borehole cavity of said large borehole and out said top end of said large borehole, wherein said large borehole has a radius of influence and said small borehole is within said radius of influence.

15. A method for intercepting, treating and venting vapors from contaminated soil in a vadose zone that extends downwardly from a ground level to a water table and from contaminated groundwater below said water table, comprising the steps of:

providing a large borehole with a selected diameter, said large borehole having a top end at said ground level, a spaced bottom end spaced at a selected depth and an inwardly facing outer wall of soil extending downwardly from said top end to said bottom end, said large borehole defining a borehole cavity, said top end being open to atmosphere above said ground level to allow unimpeded flow of gases, installing a liner of porous material in said large borehole against said outer wall and around said borehole cavity from said top end to said bottom end, filling said borehole cavity of said large borehole inside said liner with porous fill material, providing at least one small borehole with a selected diameter significantly smaller than said diameter of said large borehole, said small borehole having a top end at said ground level, a spaced bottom end at a selected depth and an inwardly facing outer wall of soil extending downwardly from said top end to said bottom end, said small borehole defining a borehole cavity, said top end being open to atmosphere above said ground level to allow unimpeded flow of gases, installing a liner of porous material in said small borehole against said outer wall and around said borehole cavity from said top end to said bottom end, filling said borehole cavity of said small borehole inside said liner with porous fill material, injecting atmospheric gases into said borehole cavity of said small borehole and into said soil with variations in atmospheric barometric pressure, and pulling said vapors from said groundwater and said soil to said borehole cavity and out said top end of said large borehole with variations in atmospheric barometric pressure, wherein said large borehole has a radius of influence and said small borehole is within said radius of influence.

16. The method as set forth in claim 15 wherein said diameter of said small borehole is less than ten percent of said diameter of said large borehole.

17. The method as set forth in claim 15 wherein said depth of said bottom end of said small borehole is less than said depth of said bottom end of said large borehole.

18. The method as set forth in claim 15 wherein said bottom end of said large borehole is below said water table and said bottom end of said small borehole is spaced above said water table.

* * * * *